(12) United States Patent
Yavid et al.

(10) Patent No.: US 7,025,272 B2
(45) Date of Patent: Apr. 11, 2006

(54) SYSTEM AND METHOD FOR AUTO FOCUSING AN OPTICAL CODE READER

(75) Inventors: Dmitry Yavid, Stony Brook, NY (US); Alex Breytman, Bellmore, NY (US); Bradley S. Carlson, Northport, NY (US); Mark Krichever, Hauppauge, NY (US); Mehul Patel, Fort Salonga, NY (US); Edward Hatton, Peterborough (CA); Paul Dvorkis, East Setauket, NY (US); Thomas D. Bianculli, Manorville, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 184 days.

(21) Appl. No.: 10/389,184

(22) Filed: Mar. 14, 2003

(65) Prior Publication Data

US 2004/0118926 A1    Jun. 24, 2004

Related U.S. Application Data

(60) Provisional application No. 60/434,519, filed on Dec. 18, 2002.

(51) Int. Cl.
G03B 3/10      (2006.01)
(52) U.S. Cl. ............... 235/462.23; 235/462.25
(58) Field of Classification Search ........... 235/462.01, 235/462.06, 462.1, 462.11, 462.22, 462.25, 235/462.26, 462.23
See application file for complete search history.

(56) References Cited

U.S. PATENT DOCUMENTS

| | | | |
|---|---|---|---|
| 3,812,459 A | 5/1974 | MacNeill et al. | |
| 4,251,798 A | 2/1981 | Swartz et al. | |
| 4,877,949 A | 10/1989 | Danielson et al. | |
| 5,192,856 A | 3/1993 | Schaham | |
| 5,308,966 A | 5/1994 | Danielson et al. | |
| 5,414,251 A | 5/1995 | Durbin | |
| 5,418,357 A * | 5/1995 | Inoue et al. ............ | 235/462.11 |
| 5,545,886 A * | 8/1996 | Metlitsky et al. ....... | 235/462.42 |
| 5,561,283 A | 10/1996 | Dvorkis et al. | |
| 5,576,529 A | 11/1996 | Koenck et al. | |
| 5,635,697 A | 6/1997 | Shellhammer et al. | |
| 5,640,001 A | 6/1997 | Danielson et al. | |

(Continued)

FOREIGN PATENT DOCUMENTS

WO        93/18478        9/1993

(Continued)

Primary Examiner—Ahshik Kim
(74) Attorney, Agent, or Firm—Carter, DeLuca, Farrell & Schmidt, LLP.

(57) ABSTRACT

An optical code reader is provided including imaging circuitry having an array of photo sensing devices capable of sensing light incident on the array and outputting a plurality of pixel signals corresponding to the sensed light. The reader further includes control and logic circuitry for receiving a subset of the plurality of pixel signals, processing the received subset of the plurality of pixel signals for determining if the received pixel signals meet at least one predetermined condition, and outputting a selection control signal in accordance with the processing results. A focus analysis software module executable by the control and logic circuitry determines the focus quality of the received pixel signals. A selector control software module executable by the control and logic circuitry generates a selection control signal in accordance with the determined focus quality of the received pixel signals. Selector circuitry selectively enables the imaging circuitry to output selected pixel signals of the plurality of pixel signals in accordance with the selection control signal.

16 Claims, 9 Drawing Sheets

U.S. PATENT DOCUMENTS

| | | |
|---|---|---|
| 5,646,390 A | 7/1997 | Wang et al. |
| 5,656,803 A * | 8/1997 | Seo ........................ 235/472.01 |
| 5,703,349 A | 12/1997 | Meyerson et al. |
| 5,710,417 A | 1/1998 | Joseph et al. |
| 5,744,790 A | 4/1998 | Li |
| 5,763,864 A * | 6/1998 | O'Hagan et al. ...... 235/462.07 |
| 5,773,806 A * | 6/1998 | Longacre, Jr. ........... 235/462.1 |
| 5,796,089 A | 8/1998 | Marom |
| 5,798,515 A | 8/1998 | Li et al. |
| 5,821,522 A | 10/1998 | Li et al. |
| 5,837,987 A | 11/1998 | Koenck et al. |
| 5,915,047 A | 6/1999 | Muramoto |
| 5,920,060 A | 7/1999 | Marom |
| 6,019,286 A * | 2/2000 | Li et al. ....................... 235/454 |
| 6,123,261 A * | 9/2000 | Roustaei ................ 235/462.01 |
| 6,123,264 A | 9/2000 | Li et al. |
| 6,138,915 A | 10/2000 | Danielson et al. |
| 6,336,587 B1 | 1/2002 | He et al. |
| 6,340,114 B1 | 1/2002 | Correa et al. |
| 6,405,925 B1 * | 6/2002 | He et al. ................ 235/462.25 |

FOREIGN PATENT DOCUMENTS

| | | |
|---|---|---|
| WO | 02/44790 | 6/2002 |
| WO | 02/063543 | 8/2002 |

* cited by examiner

SYSTEM AND METHOD FOR AUTO FOCUSING AN OPTICAL CODE READER

PRIORITY

This application claims priority to U.S. Provisional Application Ser. No. 60/434,519, filed on Dec. 18, 2002, the contents of which are incorporated herein by reference in their entirety.

BACKGROUND OF THE INVENTION

1. Field of the Invention

This invention relates to imaging in optical code reading engines. Aspects of the invention are particularly useful in solid state, area image sensing based, handheld code readers which are positioned at variable orientations and distances with respect to a target code.

2. Description of the Related Art

Optical codes are patterns made up of image areas having different light reflective or light emissive properties, which are typically assembled in accordance with a priori rules. The term "barcode" is sometimes used to describe certain kinds of optical codes. The optical properties and patterns of optical codes are selected to distinguish them in appearance from the background environments in which they are used. Devices for identifying or extracting data from optical codes are sometimes referred to as "optical code readers" of which barcode scanners are one type. Optical code readers are used in both fixed or portable installations in many diverse environments such as in stores for check-out services, in manufacturing locations for work flow and inventory control and in transport vehicles for tracking package handling. The optical code can be used as a rapid, generalized means of data entry, for example, by reading a target barcode from a printed listing of many barcodes. In some uses, the optical code reader is connected to a portable data processing device or a data collection and transmission device. Frequently, the optical code reader includes a handheld sensor which is manually directed at a target code.

Most conventional optical scanning systems are designed to read one-dimensional barcode symbols. The barcode is a pattern of variable-width rectangular bars separated by fixed or variable width spaces. The bars and spaces have different light reflecting characteristics. One example of a one dimensional barcode is the UPC/EAN code used to identify, for example, product inventory. An example of a two-dimensional or stacked barcode is the PDF417 barcode. A description of PDF417 barcode and techniques for decoding it are disclosed in U.S. Pat. No. 5,635,697 to Shellhammer et al., and assigned to Symbol Technologies, Inc., which is incorporated herein by reference in its entirety. Another conventional optical code is known as "MaxiCode". It consists of a central finder pattern or bull's eye center and a grid of hexagons surrounding the central finder. It should be noted that the aspects of the inventions disclosed in this patent application are applicable to optical code readers, in general, without regard to the particular type of optical codes which they are adapted to read. The invention described may also be applicable to some associated image recognition or analysis.

Most conventional scanning systems generate one or more beams of laser light which reflects off a barcode symbol and back to the scanning system. The system obtains a continuous analog waveform corresponding to the light reflected by the code along one or more scan lines of the system. The system then decodes the waveform to extract information from the barcode. A system of this general type is disclosed, for example, in U.S. Pat. No. 4,251,798, assigned to Symbol Technologies, Inc. A beam scanning system for detecting and decoding one and two dimensional barcodes is disclosed in U.S. Pat. No. 5,561,283, also assigned to Symbol Technologies, Inc.

Some such scanning systems are deployed in handheld units which may be manually pointed at the target. Often an individual scanner is a component of a much larger system including other scanners, computers, cabling, data terminals, etc. Such systems are frequently designed and constructed on the basis of mechanical and optical specifications for the scanning engine, sometimes called "form factors". One such form factor is the SE1200 form factor designed by Symbol Technologies, Inc.

Optical codes can also be read by employing optical code readers having an imaging engine. An imaging engine includes an image sensor having a two-dimensional array of cells or photo sensors, such as an area charge coupled device (CCD), which correspond to image elements or pixels in a field of view of the engine. The imaging engine further includes a lens assembly for focusing light incident on the image sensor and associated circuitry coupled to the image sensor outputting electronic signals corresponding to a two-dimensional array of pixel information for the field of view. The electrical signals are processed by a processor for extracting information indicative of the focus quality of an image corresponding to the field of view.

An optical code reader having selectable fields of view and working depths of view is disclosed in U.S. Pat. No. 6,340,114 B1, assigned to Symbol Technologies, Inc., the contents of which are incorporated by reference in their entirety. An imaging optical code reader adapted for use in producing video displays, such as for use in motion detection surveillance is disclosed in U.S. Pat. No. 6,336,587, assigned to Symbol Technologies, Inc, the contents of which are incorporated by reference in their entirety. However, the above assemblies do not analyze an image to determine the quality of focusing for adjusting the lens assembly in order to improve focusing of the light incident on the image sensor.

Accordingly, it is an object of the present invention to provide an optical code reader having an imaging engine with an image sensor and an adjustable lens assembly, and a computing device for processing information provided by electrical signals generated by the image sensor for determining focus quality, and generating lens adjustment control signals for adjusting the position of a lens assembly to adjust the focus quality of an image produced by an image sensor.

It is a further object of the present invention to reduce processing time for processing the electrical signals generated by the imaging sensor in order to provide rapid focusing and rapid scanning.

It is an additional object of the present invention to provide an imaging engine which can be substituted for a predetermined form factor scanning engine, such as the SE900 and SE1200 form factor scanning engines which are utilized in currently deployed optical code readers to increase the reliability, versatility and focusing ability of such readers

SUMMARY OF THE INVENTION

An optical code reader is provided including an imaging engine having an adjustable lens assembly and an image sensor with an array of photo sensors generating electrical signals indicative of sensed light incident on the photo sensors. The reader further includes a sensor select module and a computing device for generating sensor select signals for controlling selection of sensors of the array of photo sensors, processing information provided by electrical signals produced by the image sensor to determine focus quality, and generating lens adjustment control signals in accordance with the processed information until a predetermined degree of focus quality is achieved. The sensor select module is responsive to the sensor activation signals, and the adjustable lens assembly is responsive to the lens adjustment control signals.

The present invention may be provided as a single optical code reading engine or optical code reader system having the same. With the addition of appropriate control circuitry and data processing software, an imaging system may be constructed serving the object of producing a compact, inexpensively fabricated imaging engine which may be substituted for existing line scan engines. The imaging engine may be adapted for use in many different environments, with various optical fields and focal distances, for reading various codes of different size. The system may also be used for image recognition or analysis, including acquisition of data concerning the target and its environment.

In accordance with a preferred embodiment of the present invention an optical code reader is provided which includes imaging circuitry having an array of photo sensing devices capable of sensing light incident on the array and outputting a plurality of pixel signals corresponding to the sensed light; and control and logic circuitry for receiving a subset of the plurality of pixel signals, processing the received subset of the plurality of pixel signals for determining if the received pixel signals meet at least one predetermined condition, and outputting a selection control signal in accordance with the processing results. The reader further includes a focus analysis software module executable by the control and logic circuitry for determining focus quality of the received pixel signals; a selector control software module executable by the control and logic circuitry for generating a selection control signal in accordance with the determined focus quality of the received pixel signals; and selector circuitry for selectively enabling the imaging circuitry to output selected pixel signals of the plurality of pixel signals in accordance with the selection control signal.

In the preferred embodiment, the optical code reader further includes a lens assembly for focusing incident light on the array of sensing devices. The lens assembly includes at least one lens; a lens guidance assembly; and a lens adjustment mechanism for moving the at least one lens along the lens guidance assembly. A lens adjustment software module is provided which is executable by the control and logic circuitry for generating a lens adjustment control signal in accordance with the determined focus quality of the received pixel signals for controlling the lens adjustment mechanism to move the at least one lens along the lens guidance assembly. Preferably, the optical code reader is configured for imaging optical codes, and further includes a software decoder module for decoding the received pixel signals for decoding at least one imaged optical code.

Furthermore, a method is provided in accordance with the present invention for analyzing and image. The method includes the steps of: imaging an object by sensing incident light and generating a plurality of pixel signals corresponding to the sensed light; selecting a subset of pixel signals from the plurality of pixel signals in accordance with the selection control signal; and outputting the selected pixel signals. The method further includes the steps of determining the focus quality of the selected subset of pixel signals; generating a lens adjustment signal in accordance with the determined focus quality; adjusting the position of at least one lens of a lens assembly in accordance with the lens adjustment signal; and determining if the determined focus quality is within a predetermined threshold range. If the determined focus quality has a value outside the predetermined threshold range the object is re-imaged. If the determined focus quality has a value within the predetermined threshold range, all the pixel signals are selected. The method further includes the step of decoding the selected pixel signals.

BRIEF DESCRIPTION OF THE DRAWINGS

Various embodiments of the invention will be described herein below with reference to the figures wherein.

DETAILED DESCRIPTION OF THE PREFERRED EMBODIMENTS

The present invention provides an imaging optical code reader having an image sensor including an array of sensors generating respective pixel data indicative of incident light on the image sensor, and a processing system which determines the focus quality of the pixel data obtained during imaging of an object within a field of view of the optical code reader. The processing system analyzes selected pixel data. The selected pixel data are obtained by using circuitry and/or software to control the image sensor to image the object by generating only a pre-selected set of pixel data for analysis. After analyzing the pixel data, if the focus quality or other parameter is outside a predetermined threshold focus range, a lens assembly focusing light on the image sensor is moved by an amount determined by the processing system by controllably actuating the lens assembly. The pixel analysis method is repeated until the focus quality is acceptable by the processing system, e.g., the focus quality is within the predetermined threshold focus range, at which time the object is imaged using all the pixels, or, in the case where the object is constantly imaged using all of the pixels, the last captured image is provided for image processing.

By analyzing only selected pixel data to determine the focus quality, the focus quality determination method of the present invention is significantly faster than methods performed by image processing systems which analyze all of the pixel data to determine the focus quality. Further, the focus quality determination method assists in automatically focusing the object to be imaged by fine tuning the position of the lens assembly.

System Overview

Figure 1:
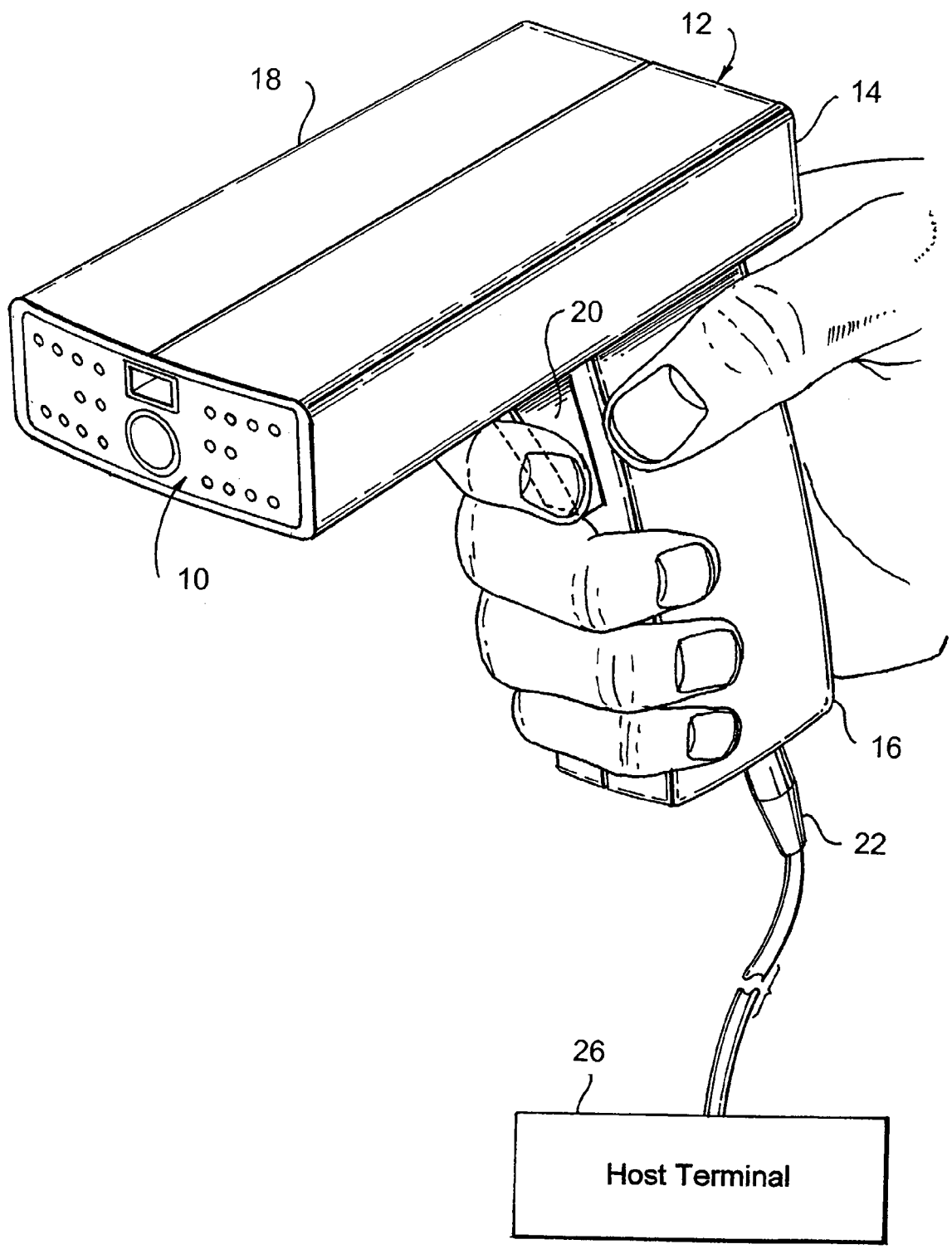
FIG. 1 is a pictorial view of a handheld optical code reader and host terminal in accordance with the present invention.

FIG. 1 is a pictorial view of a handheld optical code reader 12 and a schematic view of a host terminal 26 which may be used for various imaging functions of the present invention. The handheld code reader 12 includes a housing 14 having a generally elongated handle or hand grip 16 and an upper portion 18 for housing an imaging engine 10. The front face 15 of the imaging engine 10 appears at the forward end of the upper portion 18 of the handheld optical code reader 12. The cross-sectional dimensions and overall size of the handle portion 16 are such that the optical code reader 12 can conveniently be held in the user's hand.

The optical code reader 12 senses incident light reflected off of an object (the object may be a plurality of objects) within a field of view of the optical code reader 12 for obtaining image data. The object may be a code, such as a bar code, or a non-code object. An imaging actuation means, such as a manual trigger 20 is mounted in moving relationship on the handle portion 16 in a forward facing region of the optical code reader 12. The user's forefinger is normally used to actuate the optical code reader 12 by depressing the trigger 20 for actuating sensing and imaging of the object.

A flexible electrical cable 22 is provided to connect the optical code reader 12 to the host terminal 26. In alternative embodiments the cable 22 may also provide electrical power to the imaging engine 10. In a further alternative embodiment, the cable 22 may be partially or fully replaced by wireless communication means such as radio frequency, optical or cellular communication means. In preferred embodiments the optical code reader 12 includes a means for processing the pixel signals, and the processed information may be transmitted via cable 22 from the optical code reader 12 to the host terminal 26. A decode module may be provided in the optical code reader 12 and/or in the host terminal 26 for decoding image data corresponding to an optical code. An image data compression module may be provided for compressing the image data.

The host terminal 26 includes at least one data processor, where the at least one data processor may be connected to one or more peripherals or computing devices, such as a video monitor, and/or a network. Compressed image data may be transmitted to the host terminal 26 over electrical cable 22. The transmission of video data may be triggered by pressing the trigger 20 or by actuating another switch on the optical code reader 12. The image data may then be applied to the host terminal 26. The compressed image data may be applied to a serial communication port of the host terminal 26 such as the serial communication port of a personal computer when such a device is used as the host terminal 26. The image data may be processed by a data processor (not shown) within the personal computer and selectively displayed on monitor (not shown). A color video image may be obtained.

Figure 2:
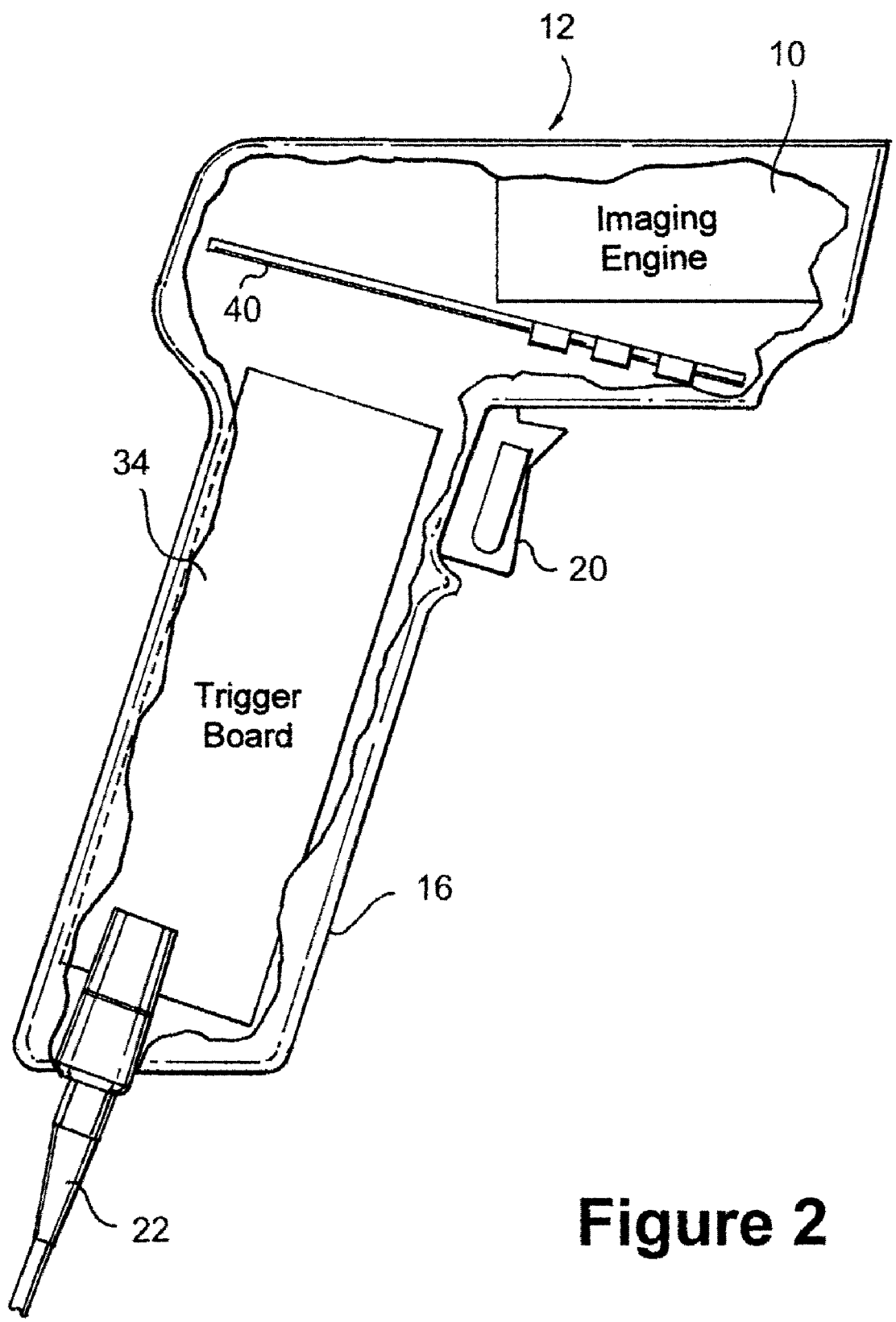
FIG. 2 is a sectional view of a preferred embodiment of the optical code reader of FIG. 1.

FIG. 2 is a sectional view of a preferred embodiment of the optical code reader 12 in accordance with preferred embodiments of the present invention showing internal components of the optical code reader 12, including the imaging engine 10, a trigger board 34, a control and a logic circuit (CLC) board 40. The trigger circuit board 34 located in the handle portion 16 of the handheld optical code reader 12 is electrically connected to switch means associated with the trigger 20 of the optical code reader 12 and processes signals indicative of the operator's depressing of the trigger 20 in order to initiate, or continue reading of optical codes. It is contemplated that actuation means that are known in the art, such as a pedal actuator or an automatic actuator responsive to a sensed or processed signal may be included in addition to or instead of trigger 20 and/or trigger board 34. The CLC board 40, or portions thereof, may alternatively be provided externally from the optical code reader 12, such as in the host terminal 26. In circumstances where the optical code reader 12 of FIG. 2 is to be retrofitted from a laser line scan engine to an optical imaging engine 10, the imaging engine 10 and CLC board 40 may be inserted in place of the line scan engine and circuit board in the optical code reader 12. In this way previously designed toolings, housings and host devices may be employed and provide continuity in upgrading the code reading system.

In alternate embodiments described in U.S. Pat. No. 6,336,587 described above, the optical code reader 12 includes a radio frequency board and an antenna which provide a mobile radio link to one or more data terminals, such as host terminal 26. Electrical power for the optical code reader 12 may be provided by battery. An infrared data interface (IRDA) or multi-contact shoe may also be provided to communicate data between the optical code reader 12 and an external receiver or docking device, respectively. Compressed image data may be transmitted to the host terminal 26 via a radio frequency link, IR communication link, or direct contact with the docking device.

It will be understood that aspects of the present invention are also applicable to imaging engines which are not located in conventional handheld scanners or guns. For example, the imaging engine 10 may be incorporated into a computer terminal in a fixed location or in a rotating turret. Such arrangements are particularly well adapted for using the imaging engine 10 as part of a video phone system which also uses the display, processing and I/O capabilities of the computer.

The optical code reader 12 of the present invention may further include frame grabbing circuitry for providing video signals for displaying images produced by the apparatus on a terminal monitor. In this case hardware modification of existing terminals may be avoided.

Alternatively, the imaging engine 10 may be attached to a portable computer device such as a PDA, or attached to portable scanning systems or terminals such as those available from assignee, Symbol Technologies, Inc. Such systems may be incorporated as part of a local area, cellular or wide area network to coordinate scanning and other image processing functions described below.

In portable applications where electrical power is supplied by batteries, it is particularly important to conserve energy. Power management techniques for such portable images may include the provision to switch the images to lower resolution or frame rates to conserve power. Alternatively, the imaging engine 10 or CLC board, or portions thereof, may be periodically shut down or enter a sleep mode, or shut down when the system senses that the battery charge level has dropped below a pre-selected level.

Imaging Engine

Figure 3:
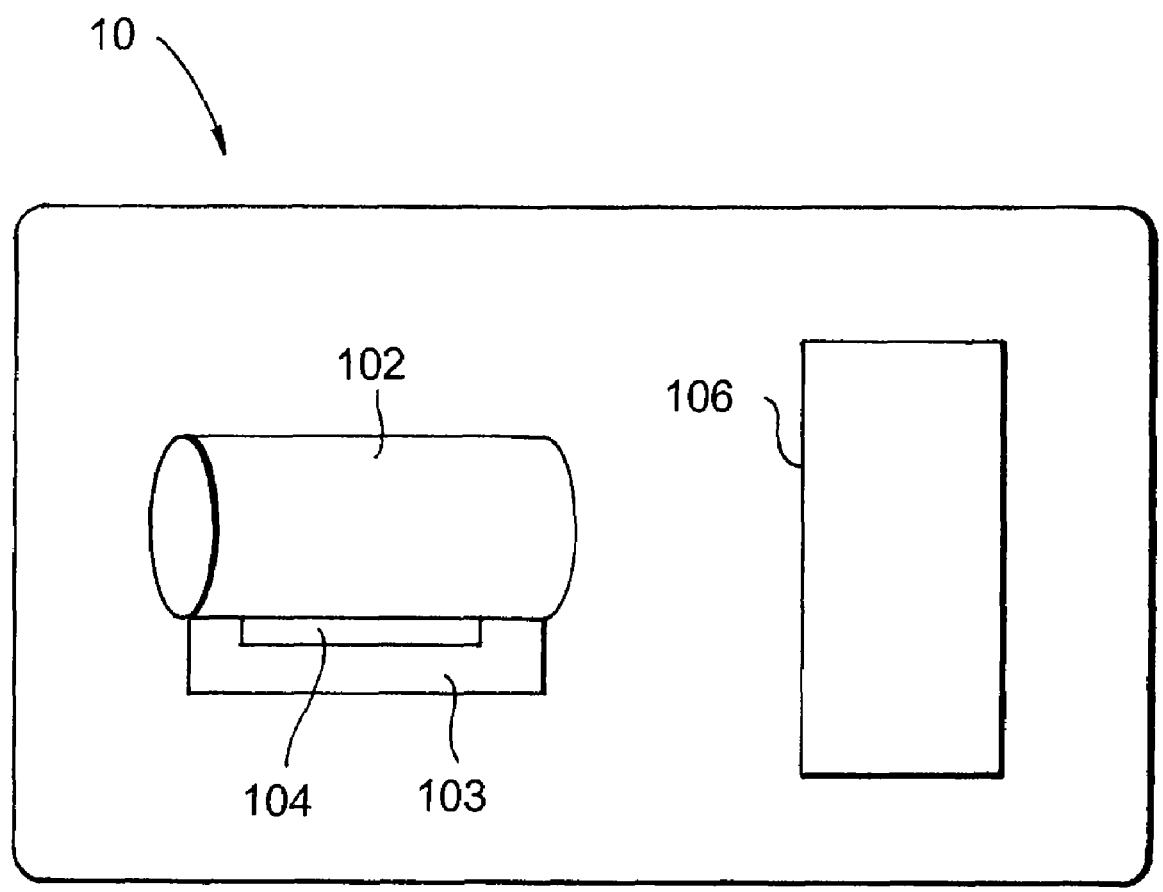
FIG. 3 is a block diagram of an imaging engine of an imaging optical code reader in accordance with the present invention.

With reference to FIG. 3, the imaging engine 10 includes a lens assembly 102 having a least one lens for focusing light incident on a photo sensor, where the lens assembly 102 is mounted on a lens guidance assembly 103, and having a lens adjustment mechanism 104 for moving at least one lens of the lens assembly 102 along the lens guidance assembly 103 for changing the focal length of the lens assembly 102. Lens adjustment mechanism 104 is operatively connected to the lens assembly 102 and/or the lens guidance assembly 103 for moving the one or more optical lenses of the lens assembly 102 along the lens guidance assembly 103. The lens adjustment mechanism 104 may be located within the imaging engine 10 or external to the imaging engine 10.

The imaging engine 10 further includes circuitry for capturing an image 106, including circuitry for photo sensing, analog-to-digital conversion, timing generation, automatic gain control (AGC) and peripheral circuits to control the above components. The circuitry for capturing an image 106 preferably includes an area based image sensor, preferably a charge coupled-device (CCD). In other embodiments the image sensor may be a CMOS device, a CMD (charge modulated device) or a CID (charge injection device) sensor. In other embodiments, the imaging engine 10 further includes an illumination system and an aiming system (not shown) as known in the art.

Figure 4:
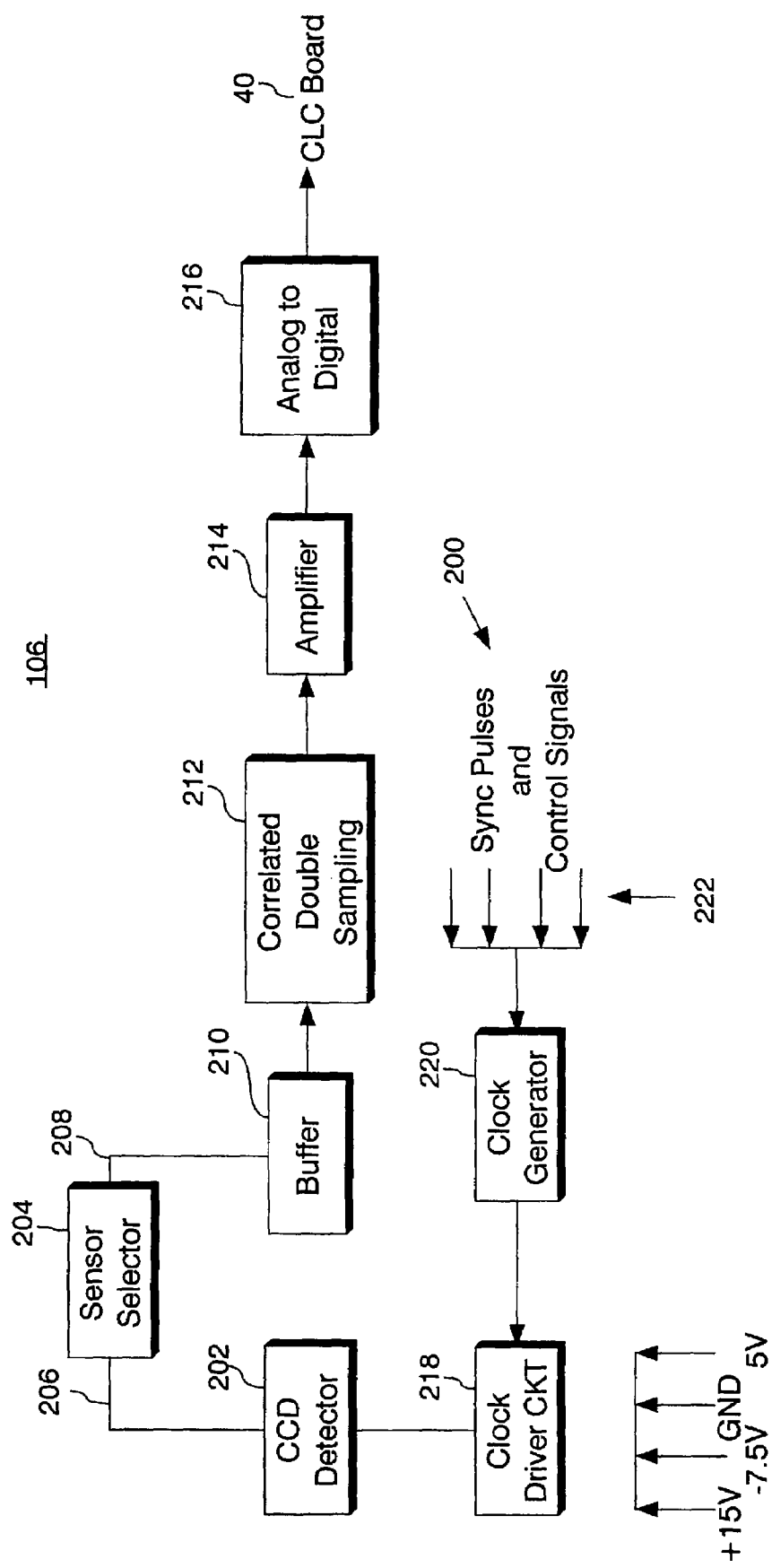
FIG. 4 is a block diagram of a circuit board used in an imaging optical code reader in accordance with the present invention.

With reference to FIG. 4, a CCD circuit board 200 included in a preferred embodiment of the circuitry for capturing an image 106 is shown. The CCD circuit board 200 includes a CCD detector 202 having an array of photo sensors (not shown) and a sensor selector 204. Each photo sensor of the array of photo sensors senses light incident on the photo sensor during an imaging session and outputs an electrical signal, also referred to herein as a pixel signal indicative of at least one parameter of the light sensed. The CCD detector 202 outputs a pixel signal associated with each photo sensor of the array of photo sensor which is propagated along path 206, where path 206 includes a plurality of signal paths, each signal path corresponding to a respective pixel signal.

A sensor selector 204 is provided along path 206 which includes means for selectively opening signal paths of path 206 of a selected subset of signal paths for disconnecting the opened signal paths of path 206. Accordingly, sensor selector 204 selectively allows all of the pixel signals, or a selected subset of the pixel signals to propagate through signal conditioning blocks 210, 212, 214 and 216 to produce digital pixel 216, also referred to as image data, which is output by the CCD circuit board, such as for being applied to the CLC board 40. The sensor selector 204 preferably includes switching means, such as a transistor electrically connected to each signal path of path 206 for selectively opening the respective signal path. As described below, sensor selector 204 receives a control signal for controlling its operation for selectively disabling signal paths of path 206.

Accordingly, selected pixel data elements, i.e., a reduced number of pixel data elements, are propagated to the CLC board 40 for processing therein. Propagation of the pixel data from the photo sensor array is a major factor in determining the speed of acquiring and processing the pixel data. Thus, a significant increase in speed in acquiring and processing the pixel data are achieved by reducing the amount of pixel data propagated from the photo sensor array at times when full resolution, i.e., pixel data associated with all of the photo sensors, is not needed.

The CCD detector 202 is further provided with clock driver signals by the clock driver circuit 218. Various sync pulses and control signals 222 are applied to a clock generator 220 from the CLC unit 40, as described further below.

It is contemplated that one or more of components 204, 210, 212, 214, 216, 218, 220 may be located external from the CCD circuit board 200. It is further contemplated that the sensor selector 204 may be positioned at another position along path 206 of the pixel signals or other propagation paths of the pixel data.

In preferred embodiments, the imaging engine is less than two cubic inches in volume and is dimensioned to replace a moving laser beam scanning engine in a handheld barcode scanner, such as SE900 and SE1200 form factor scanning engines. Such an imaging engine may be designed to read a variety of types of optical codes including high and low density barcodes at a working range of between 1½ and 18 inches, or more.

Data Processing Units

Figure 5:
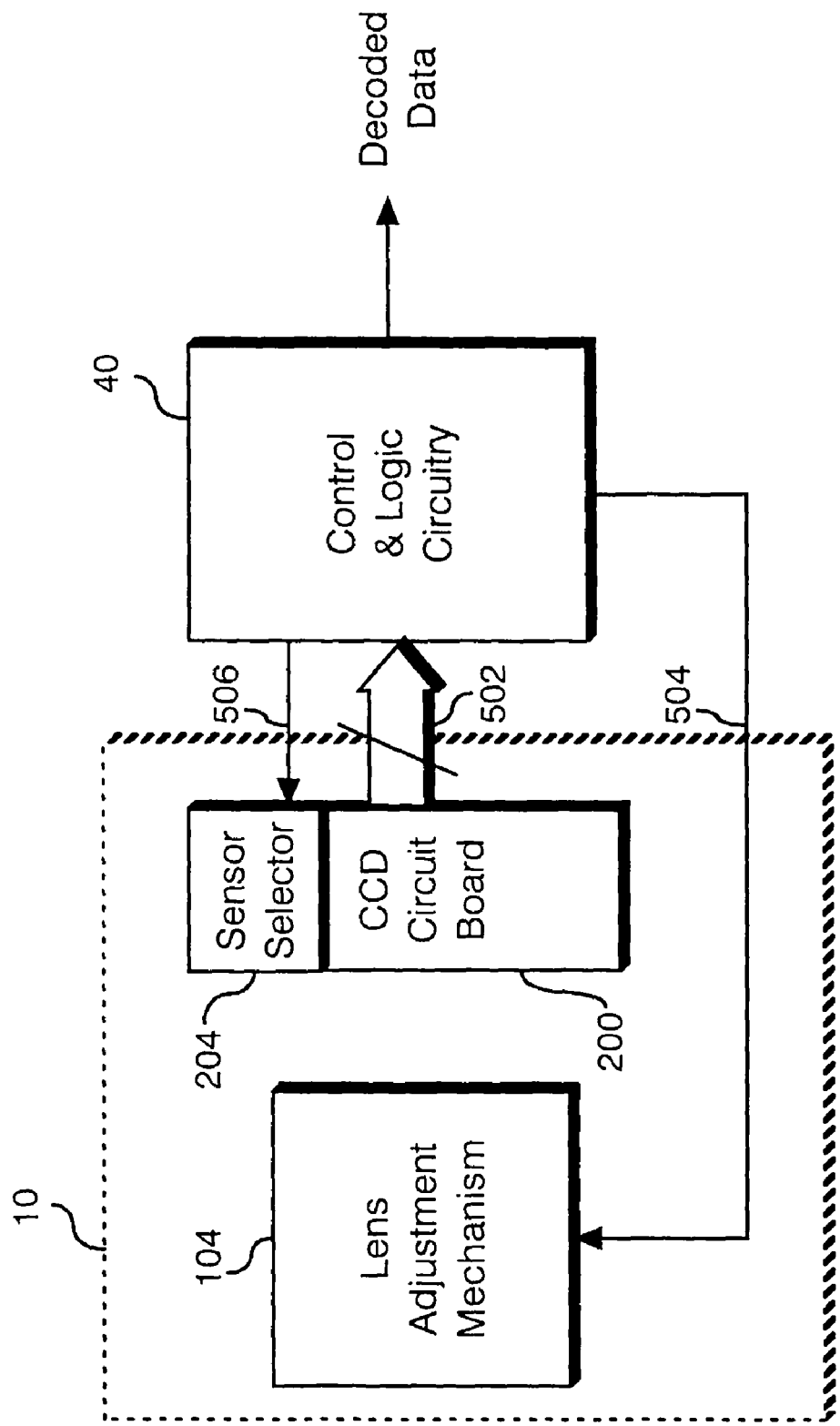
FIG. 5 is a simplified functional block diagram of a control and logic circuit board and an imaging engine of an imaging optical code reader in accordance with a preferred embodiment of the present invention.

With reference to FIG. 5, CLC board 40 is shown in communication with the imaging engine 10. The CLC board 40 receives the pixel data from the CCD circuit board 200 via data path 502, processes the pixel data, generates control signals including at least one lens adjustment control signal 504 and at least one sensor selector control signal 506 in accordance with the processed pixel data and outputs the control signals to the imaging engine 10, where the sensor selector control signal 506 is provided to the sensor selector 204 of the CCD circuit board 200, and the lens adjustment control signal 504 is provided to the lens adjustment mechanism 104.

Figure 6:
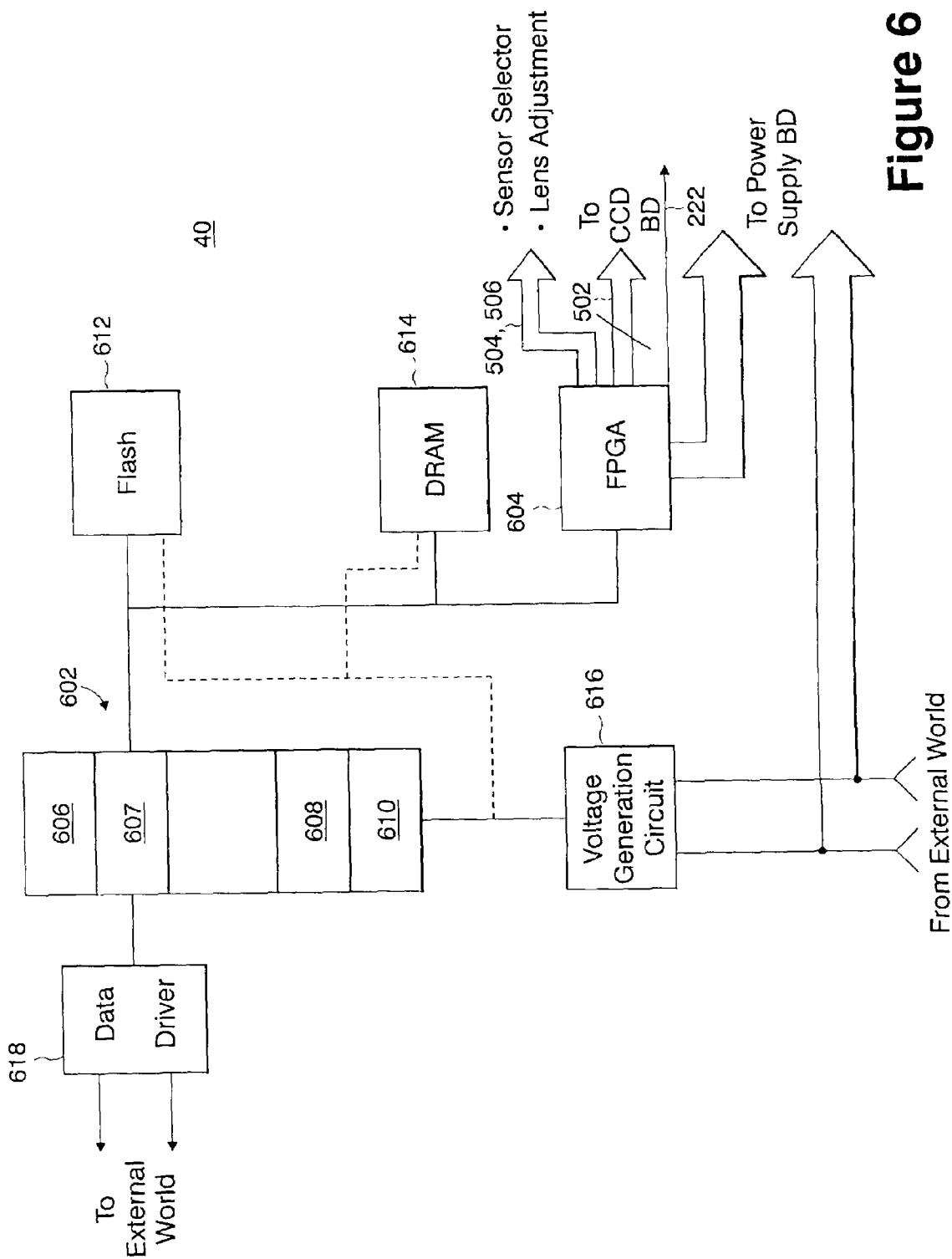
FIG. 6 is a block diagram of the control and logic circuit board of FIG. 5.

With reference to FIG. 6, a preferred embodiment of the CLC board 40 is shown. The CLC board 40 includes data processing components, including a microprocessor 602 and a field programmable gate array (FPGA) 604; software modules executable on the microprocessor 602 including a focus analyzer module 606, a lens adjustment control module 607, a sensor selector control module 608, and a decoder module 610; storage components, including a flash memory device 612 and a DRAM memory device 614; a voltage generation circuit 616 and a data bus driver 618. It is contemplated that one or more functions performed by the microprocessor 602 may be performed by the FPGA 604, and vice versa, in accordance with need and design choice.

The FPGA 604 provides an interface and a buffer between the imaging engine 10 and the microprocessor 602. Digital pixel data from the CCD circuit board 200 is supplied to the microprocessor 602 via the FPGA 604. Control signals generated by the microprocessor 602 are provided via the FPGA 604 to the imaging engine 10 and a power supply board (not shown). The microprocessor 602 may include more than one processor. In preferred embodiments the microprocessor is a 32 bit RISC embedded controller which provides high performance and functional integration with low power consumption.

The microprocessor 602 may communicate with an external device such as the host terminal 26 via the bus driver 618. Preferably, the bus driver 618 is an RS232 driver. It is envisioned that alternate bus drivers may be used as well as alternate communication means, such as wireless communication means, as described above. The flash memory device 612 and DRAM device 614 provide storage for programmable code executable by the microprocessor 602 and/or FPGA 604 as well as permanent and temporary storage of data. Alternate storage may be provided instead of or in addition to flash memory device 612 and DRAM device 614.

The voltage generation circuit 616 receives power from a power source (i.e., via cable 22 shown in FIG. 1 or a battery (not shown),) and modulates the voltage for providing the necessary voltage to the microprocessor 602 and the power supply board. In a preferred embodiment, the voltage generation circuit 616 generates a 3.3 volt signal. In alternate embodiments, one or more functions or components of the CLC board 40, such as the microprocessor 602 or portions thereof, may be included in the host terminal 26.

Conventional video data compression software may be stored in the DRAM 614 and be executed by the microprocessor 602. Compressed video images may be transmitted to the external world, such as to a serial port of the host terminal 26 to permit display or recording of the image incident on the CCD detector 202.

The control signals generated by the microprocessor 602 include the lens adjustment control signal 504 which is generated by the lens adjustment control module 607 and provided to the lens adjustment mechanism 104; and the sensor select control signal 506 which is generated by the sensor select control module 608 and provided to the sensor selector 204. Additional control signals may be provided to the image engine 10, such as to a power circuit board, to an illumination system, to an aiming system, and sync pulses and control signals 222 to the CCD circuit board 200, as described in above-mentioned U.S. Pat. No. 6,340,114.

Focus Analysis

Focus analysis is performed by the focus analysis module 606 by determining the focus quality of current pixel data and determining if the focus quality is within a focus quality threshold range. The focus analysis module 606 generates an output indicative of the determination results, such as by setting a focus quality range flag to indicate when the focus quality of the current pixel data are outside of the focus quality threshold range and/or providing a quantitative output, such as a relative focus quality signal indicative of the degree and polarity (+/−) of the focus quality of the current pixel data. Focus analysis algorithms for determining focus quality are known in the art, and may employ a frequency analysis algorithm.

Further still, the focus analysis module 606 may be used to auto-discriminate between barcodes and other objects by analyzing the pixel data. Hence, a signal indicating the type of object and other information describing the object can be provided to an image processing system before a full set of pixel data associated with the object has been generated.

Additionally, by knowing the type of object, the threshold focus quality range or image resolution can be adjusted "on-the-fly" or in real-time. For example, if the object being imaged is determined to be a bar code, the threshold focus quality can be adjusted to be within a range indicative of low to medium image resolution. If the object being imaged is determined to be a fine-printed number, the threshold focus quality can be adjusted to be within a range indicative of medium to high image resolution. It is contemplated that a scale, such as a numbering system, can also be used to quantify the focus quality. For example, the range of one to ten can be used, where the number one is equivalent to extremely poor focus quality or image resolution and the number ten is equivalent to extremely high focus quality or image resolution.

Lens Adjustment

The lens adjustment module 607 accesses the output of the focus analysis module 606, such as by checking the status of the focus quality range flag and/or accessing the relative focus quality signal. When the focus quality range flag is set, the lens adjustment module 607 generates a lens adjustment control signal 504 for controlling the lens adjustment mechanism 104 to move at least one lens of the lens assembly 106 in a directed and quantitative amount, such as by a multiple of incremental amounts. The lens adjustment control signal 504 provides either a relative (i.e., relative to the current (last stored) position), an absolute target position for the lens assembly 106, or a time interval for operating the lens adjustment mechanism 104 to move the specified lens(es) for the duration of the time interval in the specified direction. The lens adjustment control signal 504 actuates the lens adjustment mechanism 104 for moving one or more lenses of the lens assembly 106 to the target position. The lens adjustment mechanism 104 includes means such as a servo control unit (not shown) for translating the lens adjustment control signal 504 into mechanical action. Upon adjustment of the lens assembly 106, the target position may be stored as the current position of the lens assembly 106 by the lens adjustment module 607.

Sensor Selection

Sensor selection of the pixel signals and/or pixel data to be generated, propagated and/or processed is determined by the sensor selector control module 608. Preferably, upon initialization for performing a scan, i.e., actuation of trigger 20, the sensor selector control module 608 is initialized to generate a sensor selector control signal 506 for controlling the sensor selector 204 to select a predetermined subset of pixel signals. The selected set of pixel signals are processed and analyzed. Upon determination that focus quality of the selected pixel signals is within the predetermined focus quality range, the sensor selector control module 608 selects all of the pixel signals.

The predetermined subset of pixel signals is determined at the design stage in accordance with the application, such as the configuration of the optical code reader 12 and the type of optical code being read. For example, in an optical code reader configured to read one-dimensional codes, the predetermined subset of pixel signals may be associated with sensors located at the center of the of the sensor array, and in an optical code reader configured to read two-dimensional codes, the predetermined subset of pixel signals may be associated with sensors located along a selected horizontal line of the sensor array. Furthermore, the predetermined subset of pixel signals may be empirically determined.

In another embodiment, in an optical code reader 12 capable of operating in more than one configuration, the sensor selector control module 608 may be controlled (automatically or by user input via a user interface on the optical code reader 12 or associated with the host terminal 26) to operate in more than one mode. For example, in a first mode the sensor selector control module 608 will select a first predetermined set of pixel signals, and in a second mode the sensor selector module 608 will select a second predetermined set of pixel signals, etc. The sensor selector control module 608 may include software executable by the microprocessor 602 or circuitry, such as one or more logic circuits, or a combination thereof.

In the preferred embodiment, as described above with reference to FIG. 4, the sensor selector 204 is circuitry integrated into the CCD circuit board 200 capable of disabling selected signal paths traveled by the pixel signals. In an alternative embodiment, the sensor selector 204 is circuitry integrated into the CCD circuit board 200 capable of selectively disabling sensors of the CCD detector 202. In another embodiment, the sensor selector 204 is circuitry coupled to the CCD circuit board 200 capable of disabling selected outputs of the CCD circuit board 200. In another embodiment still, the sensor selector 204 is a software module executable by the microprocessor 602. The sensor selector 204 may be included in the sensor selector control module 608 or controlled by the sensor selector control module 608 for disabling processing of selected pixel data elements by other software modules executed on the microprocessor 602.

Decoding

The decoder module 610 decodes the pixel data after the focus quality of the image data has been determined to be within the predetermined focus quality range and all the pixel signals have been enabled. The decoder module 610 may be executable on the host terminal 26 instead of the microprocessor 602. In an alternative embodiment, the optical code reader 12 may be capable of imaging non-code objects in addition to optical codes, wherein the decoder module 610 may not be executed for decoding the non-code object. Alternatively, the optical code reader 12 may be used for imaging only non-code objects, and the decoder module 610 may be omitted.

Applications

The optical code reader 12 or alternative imager may use a different focus quality threshold range for different respective applications of the optical code reader 12. The focus quality threshold range may be set by default, automatically in response to a sensed or processed condition, or by user entry via a switch or other user interface.

A variety of parameters sensed by the optical code reader 12 during an imaging session may be used to select the focus quality threshold and/or the predetermined subset of pixel signals. For example, in alternate embodiments, the optical code reader 12 may be capable of imaging non-code objects. The optical code reader 12 may include a software module executable on the microprocessor 602 that is capable of determining if the object being imaged is a code or a non-code object. The focus analysis module 606 may select a stricter focus quality threshold for the non-code object, and the sensor select control module 608 may select a different predetermined subset of pixel signals than is currently selected (such as by default) for the non-code object.

The optical code reader 12 may include, in addition to, or instead of the focus analysis module 606, a module for analyzing one or more parameters of the pixel data other than focus quality, such as color, intensity, contrast, and pixel locations for non-background pixels, and for determining if the one or more parameters are within a predetermined threshold range. The sensor selector control module 608 selects a subset of pixels and generates a sensor select control signal 506 in accordance with results of the analysis. Furthermore, an adjustment control module, in addition to, or instead of the lens adjustment control module 607, generates an adjustment control signal to an adjustable component of the imaging engine 10 in response to the analysis results. Upon the analysis results falling within the predetermined threshold range, a different set of pixel data, such as a full set of pixel data, are selected for processing thereof, such as for decoding.

Operation

Figure 7A:
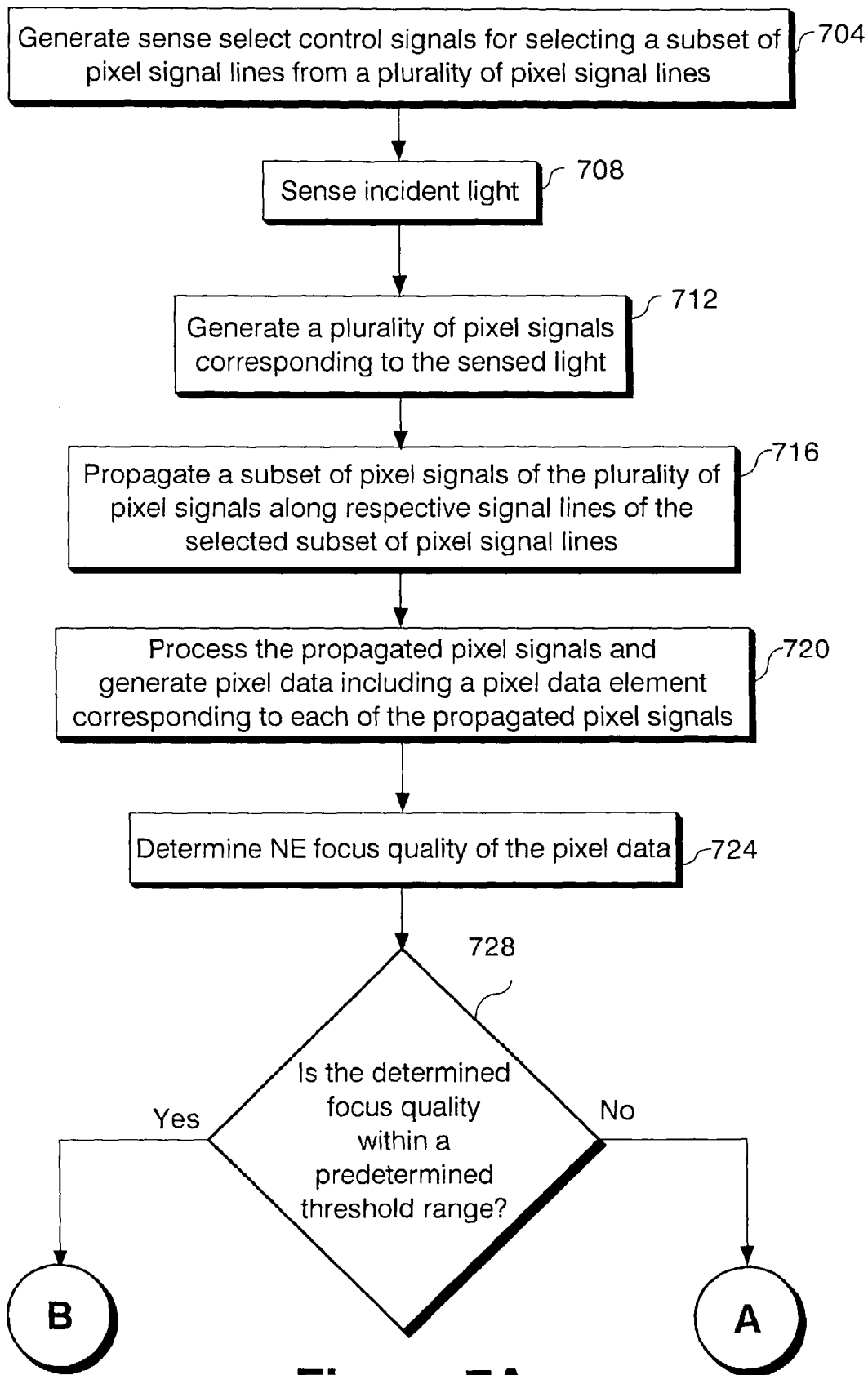
FIGS. 7A–C illustrate a flowchart showing operation of the control and logic circuit board and imaging engine of FIG. 5.
Figure 7B:
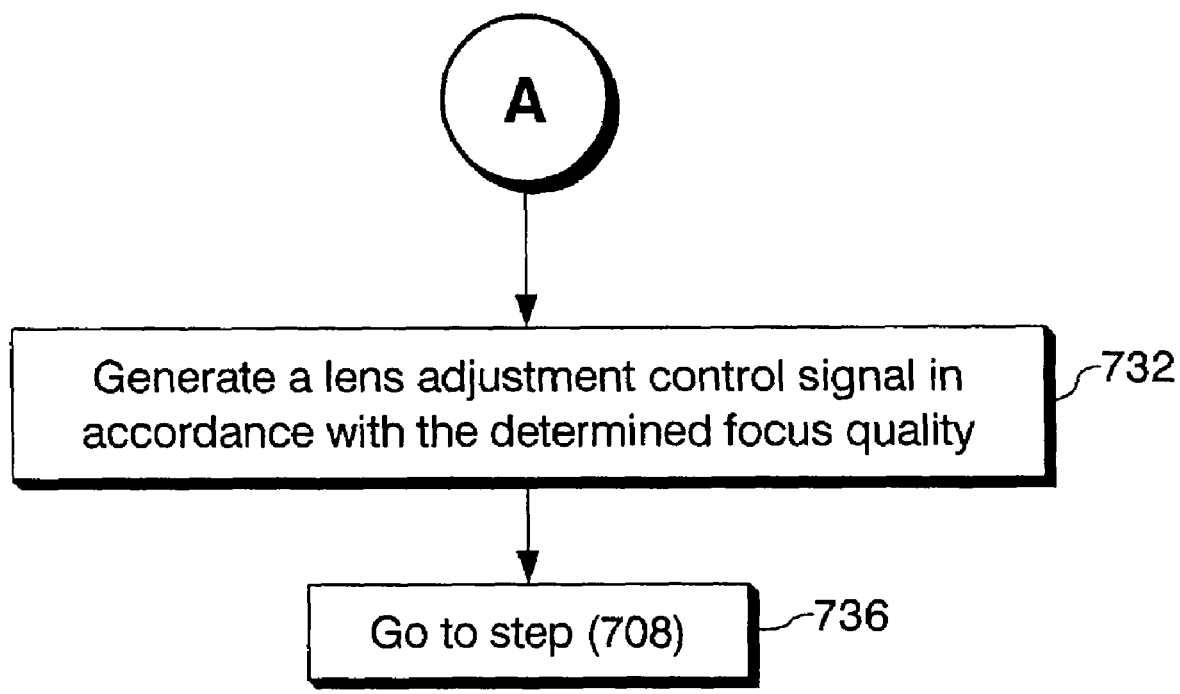

Operation of the preferred embodiment of the optical code reader 12 is described with reference to the flowchart shown in FIGS. 7A–C. With reference to FIG. 7A, at step 704, at initialization of an imaging session, sense select control signals are generated for selecting a subset of pixel signal lines from a plurality of pixel signal lines. At step 708, the array of sensors sense incident light. At step 712, the sensors generate a plurality of pixel signals corresponding to the sensed light, where each pixel signal corresponds to an associated sensor. At step 716, a subset of pixel signals of the plurality of pixel signals are propagated along respective signal lines of the selected subset of pixel signal lines.

At step 720, the propagated pixel signals are processed and pixel data are generated, including a pixel data element corresponding to each of the propagated pixel signals. At step 724, the focus quality control module 606 determines the focus quality of the pixel data. At step 728, the focus quality control module 606 determines if the determined focus quality is within a predetermined threshold range. If not, control is transferred to step 732 of FIG. 7B, in which the lens adjustment control module 607 generates a lens adjustment control signal 504 in accordance with the determined focus quality. At step 736 control is transferred to step 708 of FIG. 7A.

Figure 7C:
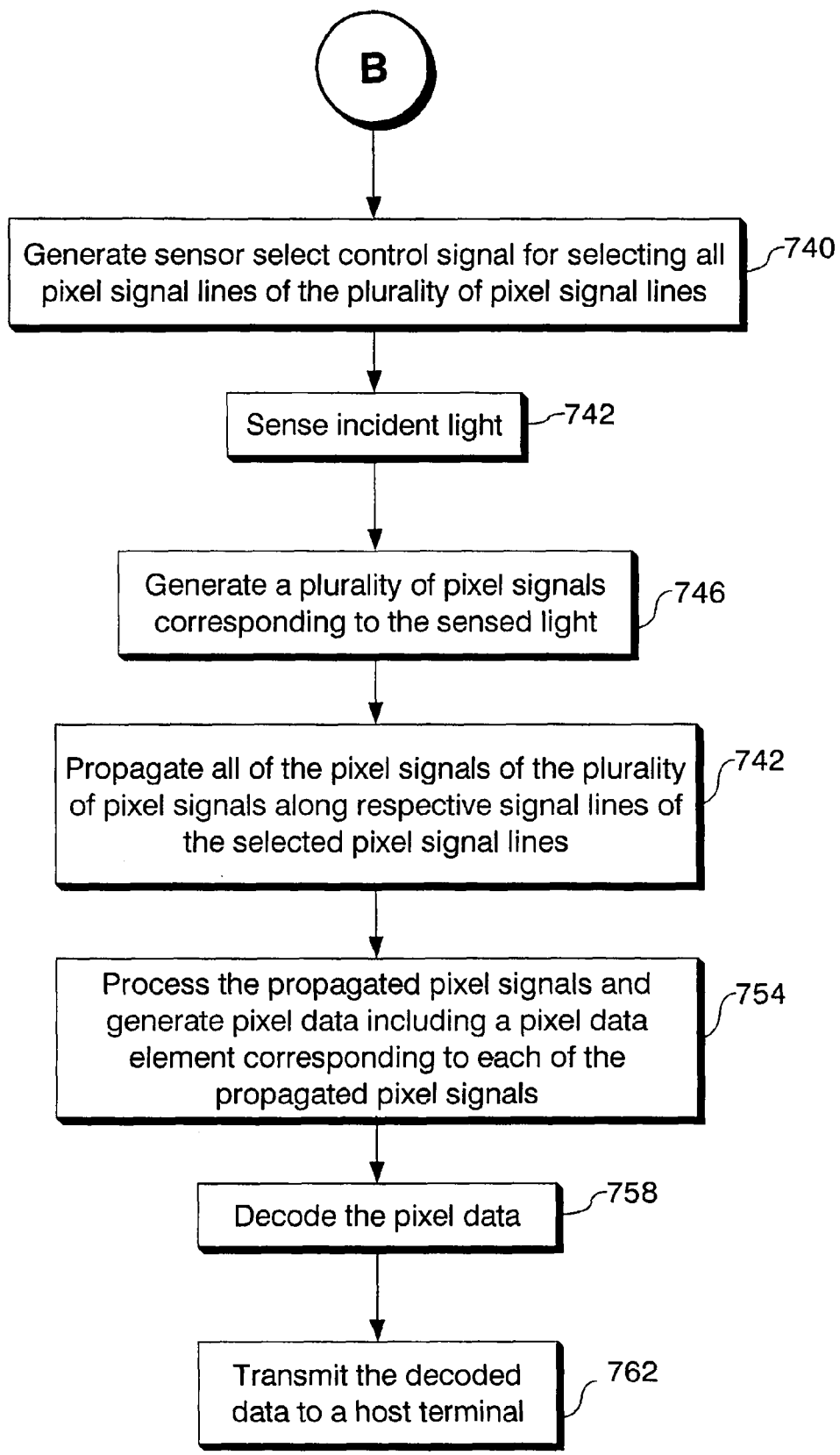

If yes, control is transferred to step 740 of FIG. 7C, in which the sensor select control module 608 generates a sensor select control signal 506 for selecting all pixel signal lines of the plurality of pixel signal lines. At step 742 the sensor array senses incident light and at step 746, the sensor array generates a plurality of pixel signals corresponding to the sensed light. At step 750, all of the pixel signals of the plurality of pixel signals are propagated along respective signal lines of the selected pixel signal lines (i.e., all of the selected pixel signal lines). At step 754, the propagated pixel signals are processed and pixel data are generated including a pixel data element corresponding to each of the propagated pixel signals. At step 758, the pixel data are decoded, and at step 762, the decoded data are transmitted to the host terminal 26.

An imaging system is disclosed having an imaging apparatus including an array of photo sensors for obtaining pixel data, a data processor for processing selected pixel data, a sensor selector controlled by the data processor for selecting pixel data. The data processor controls the sensor selector to selectively disable a subset of photo sensors or disable an output data path exiting from the photo sensor, so that pixel data are provided to the data processor or other component of the imaging system from only the enabled photo sensors or photo sensors having an enabled output data path. The pixel data are analyzed by the data processor or another data processor and an adjustment is made to the imaging apparatus in accordance with the analysis results. Upon the analysis results meeting a predetermined condition, a different subset or none of the photo sensors or photo sensor output data paths are selected for disabling.

The described embodiments of the present invention are intended to be illustrative rather than restrictive, and are not intended to represent every embodiment of the present invention. Various modifications and variations can be made without departing from the spirit or scope of the invention as set forth in the following claims both literally and in equivalents recognized in law.

What is claimed is:

1. An optical code reader system for imaging a target object during an imaging operation, said optical code reader system comprising:

imaging circuitry having an array of photo sensing devices capable of sensing light incident on the array and outputting a plurality of pixel signals corresponding to the sensed light;

at least one processor for receiving and processing signals of the plurality of pixel signals;

an analysis software module including programmable instructions executable by the at least one processor for analyzing the received signals and determining if the analyzing results meet a predetermined condition;

a data path having a plurality of signal paths along which respective pixel signals of the plurality of pixel signals are propagated upon propagation from the imaging circuitry to the at least one processor;

selector circuitry for selectively enabling selected signal paths of the plurality of signal paths for allowing propagation of signals of the respective pixel signals only along the enabled signal paths; and a selector control module for generating at least one control signal for controlling the selector circuitry for initially enabling a first subset of signal paths of the plurality of signal paths, and enabling a second subset of signal paths of the plurality of signal paths when the predetermined condition is met.

2. The imaging optical code reader system according to claim 1, wherein the analysis software module analyzes focus quality and generates a focus quality value, and the predetermined condition includes the focus quality value lying in a predetermined threshold range.

3. The imaging optical code reader system according to claim 1, wherein the imaging optical code reader system is configured for imaging at least optical codes, and the imaging system further comprising a software decoder module including a series of programmable instructions executable on the at least processor for decoding the received signals for decoding at least one imaged optical code.

4. The imaging optical code reader system according to claim 1,
    further comprising an adjustment mechanism for adjusting a parameter of the imaging; and
    an adjustment control module including a series of programmable instructions executable by the at least one processor for generating at least one control signal for adjusting the adjustsment mechanism;
    wherein when the predetermined condition is not met the adjustment control module generates the at least one control signal to control the adjustment mechanism in accordance with results of the analysis.

5. The optical code reading system according to claim 4, further comprising:
    a lens assembly for focusing incident light on the array of photo sensing devices, the lens assembly comprising:
        at least one lens;
        a lens guidance assembly; and
        the adjustment mechanism moves the at least one lens along the lens guidance assembly.

6. The optical code reading system according to claim 2, wherein the predetermined threshold range is selectable.

7. The optical code reading system according to claim 1, wherein the selector circuitry selectively disables propagation of the respective pixel signals along non-selected respective signal paths of the plurality of signal paths by opening the opening the non-selected respective signal paths for disrupting propagation of the respective pixel signals along the non-selected respective signal paths.

8. The optical code reading system according to claim 1, wherein at least one of the first and second subsets of pixel signals are selectable.

9. The optical code reading system according to claim 1, wherein the selector circuitry includes a plurality of switches for selectively enabling propagation along respective signal paths.

10. The optical code reading system according to claim 9, wherein respective switches of the plurality of switches are transistors.

11. A method for imaging a target object during an imaging operation, said method comprising the steps of:
    (a) sensing incident light;
    (b) generating a plurality of pixel signals corresponding to the sensed-light;
    (c) generating a control signal for controlling enablement of a first subset of signal paths of a plurality of signal paths;
    (d)) enabling the first subset of signal paths in accordance with the control signal generated in step (c);
    (e) propagating respective pixel signals of the plurality of pixel signals along the enabled first subset of signal paths;
    (f) analyzing the propagated pixel signals;
    (g) determining if the analyzing results meet a predetermined condition;
    (h) generating the control signal for controlling enablement of a second subset of signal paths of the plurality of signal paths when the predetermined condition is met another plurality of pixel signals corresponding to light sensed in step (g);
    (i) enabling the second subset of signal paths in accordance with the control signal generated in step (h) a greater number of signal paths of said plurality of signal paths than the number of signal path enabled in step (d); and
    (j) propagating respective pixel signals of the plurality of pixel signals generated in step (h) via respective signal paths enabled in step (i) along the enabled second set of signal paths.

12. The method according to claim 11, wherein the analyzing step includes analyzing focus quality of the pixel signals propagated in step (e) and generating a corresponding focus quality value and the predetermined condition includes the focus quality value being included in a predetermined threshold range.

13. The method according to claim 11, further comprising the step of controlling adjusting of a parameter of the imaging in accordance with results of the analyzing step when the predetermined condition is not met.

14. The method according to claim 11, wherein the steps (d) and (i) further comprise the step of disrupting propagation of signals of the plurality of signals along signal paths of the plurality of signal paths that are not enabled.

15. The method according to claim 11, wherein the steps (d) and (i) further comprise the step of opening signal paths of the plurality of signal paths that are not enabled.

16. A method for imaging a target object during an imaging operation, said method comprising the steps of:
during a first time period of said imaging operation:
    (a) focusing light;
    (b) sensing the focused light;
    (c) generating a plurality of pixel signals corresponding to the sensed light;
    (d) controlling enablement of a first subset of signal paths of a plurality of signal paths;
    (e) enabling the first subset of signal paths in accordance with the controlling of step (d);
    (f) propagating respective pixel signals along the enabled first subset of signal paths;
    (g) analyzing a focus quality of the propagated pixel signals;
    (h) generating a focus quality value corresponding to the focus quality;
    (i) determining if the focus quality value is included in a predetermined threshold range;
    (j) when the results of the determining step indicate that the focus quality is not included in the predetermined threshold range adjusting the focusing performed in the focusing step, and repeating steps (a)–(j);
    (k) when the results of the determining step indicate that the focus quality is included in the predetermined threshold range, during a second time period of said imaging operation, controlling enablement of a second subset of signal paths of the plurality of signal paths, wherein the first subset of signal paths is a subset of the second subset of signal paths;
    (l) enabling the second subset of signal paths in accordance with the controlling of step (k);
    (m) propagating respective pixel signals of the plurality of pixel signals along the enabled
second subset of signal paths; and
    (m) processing the propagated signals.

* * * * *